Patented Sept. 2, 1930

1,774,929

UNITED STATES PATENT OFFICE

GUSTAVE E. LANDT AND WILLIAM H. ADAMS, JR., OF NORRISTOWN, PENNSYLVANIA, ASSIGNORS, BY MESNE ASSIGNMENTS, TO CONTINENTAL DIAMOND FIBRE COMPANY, OF NEWARK, DELAWARE, A CORPORATION OF DELAWARE

METHOD OF MAKING HEXAMETHYLENETETRAMINE

No Drawing. Application filed January 4, 1927. Serial No. 159,014.

Our invention relates to a method of making hexamethylenetetramine and has for one object the preparation of this substance in an organic solvent.

A further object of our invention is to provide a more economical method for preparing hexamethylenetetramine than has heretofore been used, which method eliminates two steps in the plant practice now employed.

Another object of our invention is to provide a method of preparing hexamethylenetetramine which is continuous, that is to say, from which the hexamethylenetetramine may be separated in crystalline form while the reaction involving the preparation of the substance continues in the solution.

A further object of our invention is to provide a process for the manufacture of synthetic resin varnish vehicles by which hexamethylenetetramine will be prepared in the organic solution in which the initial condensation product of the synthetic resin is dissolved, or is to be dissolved, thereby obviating the necessity of separating the hexamethylenetetramine in a crystalline form, and resulting also in a material saving in organic solvents.

At the present time, hexamethylenetetramine is prepared commercially by passing a stream of ammonia gas or a solution of ammonium hydroxide into a water solution of formaldehyde whereupon the ammonia and the formaldehyde react, liberating water and forming the hexamethylenetetramine. Hexamethylenetetramine is relatively soluble in water and therefore must be recovered by evaporation. In order that the hexamethylenetetramine may be in a purified crystalline form, it is redissolved in alcohol and recrystallized therefrom.

Our invention is characterized by the reaction of the formaldehyde and the ammonia in an organic solvent solution, thereby eliminating two steps now used in plant practice, namely, the evaporation of the water from the original reaction products and the subsequent re-crystallization of the hexamethylenetetramine from the alcohol. We preferably employ as the organic solvent ordinary commercial alcohol which, as is well known, contains 5% of water. This small amount of water which is present in commercial alcohol and the amount of water formed chemically during the process is sufficient to keep the hexamethylenetetramine to some extent in solution. The formaldehyde may be dissolved in the alcohol and the gaseous ammonia passed therein or the process may be reversed by dissolving the ammonia in the alcohol and passing formaldehyde into it. A satisfactory method also results if both the formaldehyde and the ammonia are passed into the alcohol simultaneously. When the reaction is continued until the solution becomes saturated and the hexamethylenetetramine crystallizes out, then a continuous process for the manufacture of hexamethylenetetramine results from which the crystalline hexamethylenetetramine may be removed from the reaction mixture in a relatively pure condition and one which is ready for the market, while the reaction in the solution is continued.

In the preparation of hexamethylenetetramine from formaldehyde and ammonia, six mols of the former react with 4 mols of the latter to form the compound. The reaction may be represented as follows:

$$6CH_2O + 4NH_3 = (CH_2)_6N_4 + 6H_2O$$

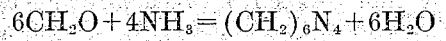
Formaldehyde  Ammonia  Hexamethylenetetramine  Water

Hence in the preparation of the compound according to the method here disclosed, the ratio of the two reacting components if they are to be passed simultaneously into the solution are kept approximately in this ratio. However, if one of the components is dissolved in the solvent, then the other is passed into the solution until the reaction is complete, whereupon more of the component in solution may be added and the process continued. The balancing of the ratio of the components is within the skill of one familiar with chemical preparations and will to some extent depend on the condition of operation, for example at times in order to insure a complete reaction it may be advisable to have present an excess of one of the reacting substances. Since organic solvents are used, the temperature of the solution is always kept below the boiling point of the solvent and a temperature of 75° C. for the solution is the maximum at which the reaction should be carried out. This temperature is just below the boiling point of alcohol.

The synthetic resin industry in the manufacture of synthetic resin varnishes uses large quantities of alcohol in the preparation of these solutions. To this synthetic resin solution in alcohol often times crystalline hexamethylenetetramine is added, in order that a potentially reactive varnish will be formed by which term is meant one that can be converted by heat easily and quickly into a hard, infusible synthetic resin. By the use of the solution of hexamethylenetetramine herein described, the potentially reactive varnish can be prepared simply by adding the initial condensation product thereto without any recovery of the hexamethylenetetramine with its accompanying loss of alcohol. This direct step therefore is of great value in this industry for the manufacturers of synthetic resin varnishes may saturate the alcohol which is to be used as a solution in the manufacture of the varnish with the hexamethylenetetramine and there will be no subsequent losses either of the material or of the alcohol. Attention is called to our co-pending application Serial No. 216,787, filed August 31, 1927, as a division of the present case. In this divisional case, claims are directed to this specific process.

An optional method of preparing a synthetic resin varnish which has proved to be satisfactory comprises passing the gaseous reacting components, that is the formaldehyde and ammonia, into a solution of the synthetic resin in alcohol. In this case, the formaldehyde and ammonia will react to form hexamethylenetetramine in the varnish itself thereby rendering it potentially reactive. Attention is called to our co-pending application Serial No. 216,788, filed August 31, 1927, as a division of the present case. In this divisional case, claims are directed to this specific process.

While the above processes are applicable for many types of synthetic resins, they are especially adapted for use with that type of synthetic resin known as phenolic condensation products, that is to say one in which a phenol is reacted with another compound such as formaldehyde, glycerine, furfural and the like.

Considerable modification in the proportions used and in the methods of carrying out the process are possible with no departure from the essential features of our invention.

We claim:

1. A process for the manufacture of hexamethylenetetramine which comprises reacting ammonia and formaldehyde in alcohol at a temperature below 75° C.

2. A process for the manufacture of hexamethylenetetramine which comprises passing formaldehyde and ammonia into alcohol at a temperature below 75° C.

3. A process for the manufacture of hexamethylenetetramine which comprises passing formaldehyde and ammonia into alcohol at a temperature below 75° C. with the subsequent removal of the crystals as the solution becomes saturated.

4. A continuous process for the manufacture of hexamethylenetetramine which comprises reacting ammonia and formaldehyde in alcoholic solution at a temperature below 75° C. and removing the crystals of hexamethylenetetramine as they separate from the solution.

5. A process for preparing a synthetic resin varnish vehicle which comprises passing formaldehyde and ammonia into alcohol at a temperature below 75° C. to form hexamethylenetetramine, there being present sufficient alcohol to keep the hexamethylenetetramine in solution.

6. A process for the manufacture of hexamethylenetetramine which comprises reacting ammonia and formaldehyde in alcohol containing a little water at a temperature below 75° C.

7. A process for preparing a synthetic resin varnish vehicle which comprises passing formaldehyde and ammonia into alcohol containing a little water at a temperature below 75° C. to form hexamethylenetetramine, there being present sufficient solvent to keep the hexamethylenetetramine in solution.

GUSTAVE E. LANDT.
WM. H. ADAMS, Jr.